(12) United States Patent
Doglioni Majer

(10) Patent No.: US 9,750,368 B2
(45) Date of Patent: Sep. 5, 2017

(54) DEVICE FOR DISPENSING BEVERAGES FROM CAPSULES

(71) Applicant: RHEAVENDORS SERVICES S.p.A, Como (IT)

(72) Inventor: Carlo Doglioni Majer, Como (IT)

(73) Assignee: RHEAVENDORS SERVICES S.p.A, Como (IT)

( * ) Notice: Subject to any disclaimer, the term of this patent is extended or adjusted under 35 U.S.C. 154(b) by 0 days.

(21) Appl. No.: 14/434,529

(22) PCT Filed: Oct. 14, 2013

(86) PCT No.: PCT/IB2013/059344
§ 371 (c)(1),
(2) Date: Apr. 9, 2015

(87) PCT Pub. No.: WO2014/060932
PCT Pub. Date: Apr. 24, 2014

(65) Prior Publication Data
US 2015/0272377 A1      Oct. 1, 2015

(30) Foreign Application Priority Data

Oct. 16, 2012   (IT) .............................. MI2012A1745

(51) Int. Cl.
*A47J 31/06*      (2006.01)
*A47J 31/40*      (2006.01)
*A47J 31/36*      (2006.01)

(52) U.S. Cl.
CPC ......... *A47J 31/407* (2013.01); *A47J 31/3633* (2013.01); *A47J 31/3638* (2013.01)

(58) Field of Classification Search
CPC ... A47J 31/3633; A47J 31/3638; A47J 31/407
(Continued)

(56) References Cited

U.S. PATENT DOCUMENTS

| | | | | |
|---|---|---|---|---|
| 4,158,330 A | * | 6/1979 | Vitous ..................... | A47J 31/54 392/481 |
| 7,469,628 B2 | * | 12/2008 | Mandralis ........... | A47J 31/4467 99/279 |
| 2008/0134902 A1 | * | 6/2008 | Zimmerman ........... | A47J 31/32 99/302 R |

FOREIGN PATENT DOCUMENTS

| | | |
|---|---|---|
| EP | 0 041 931 A1 | 12/1981 |
| EP | 1 767 129 A1 | 3/2007 |

(Continued)

OTHER PUBLICATIONS

Search Report for corresponding IT MI20121745 dated May 7, 2013.

(Continued)

*Primary Examiner* — Phuong Nguyen
(74) *Attorney, Agent, or Firm* — Sughrue Mion, PLLC

(57) ABSTRACT

Machine for preparing beverages from capsules, wherein the machine has a vertical axis (V-V) and comprises a dispensing assembly (1), the assembly in its turn comprising: means for containing a capsule (3), comprising a first element (4) and a second element (5) movable one respect to the other to define, in a closed position, a chamber for extracting the capsule, according to an axis (A-A) of said means; guiding means (2) for inserting the capsule (3) inside said assembly (1), and for retaining it in an intermediate position, different from the extraction position of the beverage; and ducts for feeding an infusion fluid into said capsule and dispensing a beverage from said capsule, characterized in that said axis (A-A) of the containing means (4, 5) of the capsule (3) is tilted with respect to the vertical axis (V-V) of the machine of an angle (α) lower than 45 degrees.

10 Claims, 17 Drawing Sheets

(58) Field of Classification Search
USPC .............. 99/302 R, 279–323, 495, 516, 536, 99/275–277; 426/433, 475, 506, 77, 435, 426/431, 425, 295
See application file for complete search history.

(56) References Cited

FOREIGN PATENT DOCUMENTS

WO    2008/096385 A1    8/2008
WO    2011/077317 A2    6/2011

OTHER PUBLICATIONS

International Search Report for PCT/IB2013/059344 dated Jan. 23, 2014.
International Preliminary Report on Patentability dated Apr. 30, 2015 from the International Bureau in counterpart International application No. PCT/IB2013/059344.

* cited by examiner

DEVICE FOR DISPENSING BEVERAGES FROM CAPSULES

CROSS REFERENCE TO RELATED APPLICATIONS

This application is a National Stage of International Application No. PCT/IB2013/059344 filed Oct. 14, 2013, claiming priority based on Italian Patent Application No. MI2012A 001745 filed Oct. 16, 2012, the contents of all of which are incorporated herein by reference in their entirety.

SUMMARY OF THE INVENTION

The present invention concerns a machine and a method for preparing beverages from capsules. More in particular, the present invention refers to a machine provided with a dispensing assembly of beverages, for example coffee, from a capsule with a flange of the single-dose type; the assembly is provided with at least one containing means adapted to form an infusion chamber around the capsule, ensuring the tightness during the dispensing step.

FIELD OF THE INVENTION

Various types of machine with dispensing assemblies for capsules are known. In general, such as for example in EP 1646305, the dispensing assembly has an horizontal axis and the capsule is vertically inserted into the assembly; the assembly has two containing elements of the capsule, one movable and the other one fixed, enclosing the capsule during the dispensing step, engaging the capsule flange, so that to obtain the required tightness. At the end of the dispensing the capsule remains in its position until the two containing elements move away one from another in order to insert a new capsule and the used capsule is removed from the dispensing assembly by gravity, i.e. it falls into a receptacle below.

Further the known assemblies have means for guiding the capsule in an intermediate position and retaining means for extracting the capsule from the containing portions of the capsule at the end of the dispensing, when the two portions are separated. However, these assemblies are bulky and not so much adapted to be used in combination in a machine also comprising an assembly for dispensing beverages from soluble products. Furthermore, a problem of said known assemblies is to position the capsule correctly in the containing means; as a matter of fact, the capsule, once inserted, remains tilted and must be straightened up from the movable part of the containing means. An additional problem is that there no flexibility in capsule types used by the machine, the latter being de facto bound to only one capsule profile.

Still another problem is to prevent beverage stagnations on the machine after the dispensing of the beverage itself.

Object of the present invention is to solve the afore mentioned problems and to realize a machine for preparing beverages that is able to accommodate a capsule assembly and sufficiently flexible for the use of different capsules.

DESCRIPTION OF THE INVENTION

Such an object is achieved by the machine according to claim 1. Preferred features are described in the dependent claims.

A dispensing assembly, for the use in a machine of the afore described type, is an additional object of the Patent.

Another object of the Patent is a method for preparing a beverage according to claim 8.

The invention presents a number of advantages relative to the known art. The axis of the dispensing assembly is little tilted with respect to the vertical axis of the machine, therefore the assembly can be housed therein thereby achieving a space saving, for example sideways the assembly of soluble products. Another advantage is that the capsule is inserted and positioned in the assembly with the axis substantially already corresponding to the axis of the extraction position; this and the almost vertical position of the assembly offer the possibility of using also capsules with different profiles on the same assembly, provided that the flange of the capsules can be tightened between the two portions of the containing means.

Another advantage is that the tilted position allows draining the beverage remained in the capsule when the beverage dispensing is ended. Furthermore, the new capsule to be introduced provides, during the insertion, for the displacement of the capsule still present from the preceding dispensing by acting on the body side of the old capsule.

BRIEF DESCRIPTION OF THE FIGURES

These and other advantages will be evident from the following description of illustrative embodiments but not limiting the invention, where.

DETAILED DESCRIPTION OF SOME EMBODIMENTS OF THE INVENTION

Figure 1:
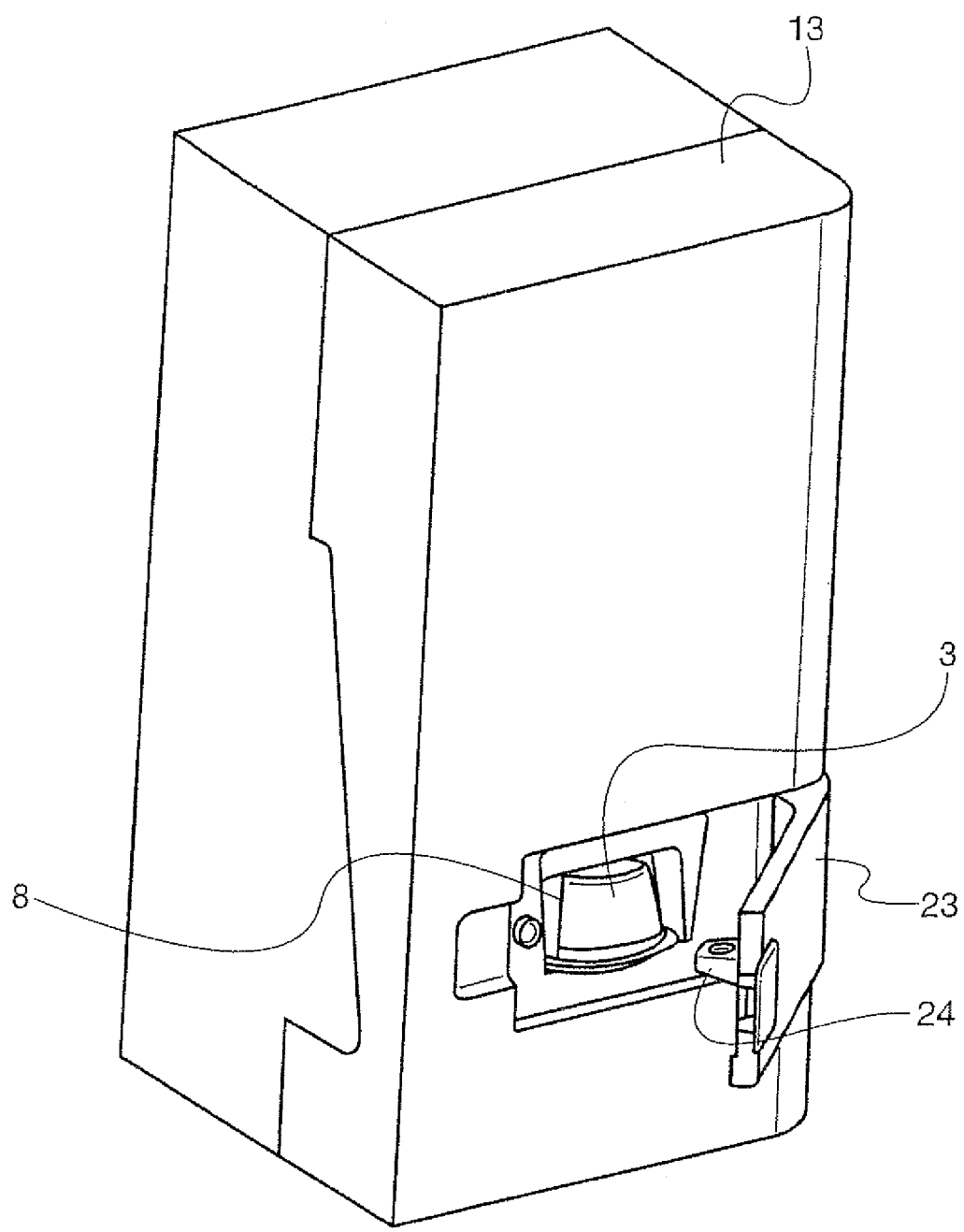
FIG. 1 is an view from the outside of a machine containing the assembly according to the present invention.

In the embodiments hereinafter, only some of possible means for piercing the capsule known in the art are shown, but the invention is not limited to such embodiments and comprises different means for opening the capsule according to the kind of the capsule itself. For example, the capsule can be provided with holes already present in the wall for the inlet of the infusion water and, in case, also in the beverage dispensing wall.

The invention can be used indifferently with capsules in which the infusion liquid flows from the base to the flange and vice versa.

Referring to figures, the machine 30 for preparing beverages from capsules 3 comprises, in a known way, an assembly 1 for preparing and dispensing coffee (or other beverages) from a capsule 3. The assembly 1 is housed in a carter or outer frame 13.

More in detail, the frame 13 has, on the outside, an opening 28 shaped in such a way to aid the insertion of a capsule 3. The opening is closable by a door 23 that is rotatably mounted on the frame 13 and provided with pushing means 24 for introducing the capsule 3 into the assembly 1. The pushing means 24 are shaped in such a way to push the capsule 3 into the assembly 1 through the opening 28. The assembly 1 comprises guide means 2 for introducing a capsule 3 into the assembly 1, containing means 4, 5 of the capsule, ducts 6, 7 for feeding an infusion fluid into e from the capsule 3. The containing means comprise two portions 4, 5 that are mutually movable and comprise a seat 9, in the means 4, for accommodating at least partially a capsule 3 and means for sustaining the capsule in the means 5. The capsule is positioned so that to be between the portions 4 and 5 of the containing means and to be tightened between them at the flange 3a when the portions 4 and 5 are moved one towards the other during the dispensing step of the beverage. In the following description the containing means 4 will be defined as "first containing means" 4, and the second element of the containing means 5 will be named as "second containing means" 5.

As shown in figures, at least the containing means 4, 5, and preferably the whole assembly, are arranged so that their axis A-A is angled, that is tilted, with respect to the vertical axis V-V of the machine.

More in detail, the containing means 4, 5, and preferably the whole assembly 1, have an axis A-A tilted with respect to the vertical axis V-V of the machine of an angle α lower than 45°. The α angle is preferably comprised between 3° and 20°, and more preferably between 8° and 15°. A tilt angle of 12° of the containing means 4, 5, with respect to the vertical, would be particularly advantageous. The reduced angle of the A-A axis with respect to the vertical allows the capsule 3 to be inserted into the extracting assembly 1, the axis of the capsule 3 being in an almost vertical position, contrary to what happens in known machines.

For introducing the capsule 3 into the assembly 1, guiding means 2 for retaining the capsule 3 are provided that are shaped, in the shown embodiment, as two splayed jaws rotatable around the pins 10 constrained to the frame 13. Elastic means, not shown in figures, urge the guiding means 2 in a known way towards a closed position of said guiding means 2, that is they force the jaws one towards the other. The guiding means 2 have a U-shaped profile 2a, in order to allow the flange 3a of a capsule 3 to slide along the guiding means 2. The guiding means 2 are shaped so that they can be splayed, preferably, by the engagement with the containing means 4, 5 in such a way to be able to control the opening, i.e. the splaying of the guiding means 2, as detailed hereinafter.

The guiding means 2 define, in a way known in the art, an intermediate position of the capsule 3, shown in FIG. 15; the capsule, after being inserted into the guide 2, is initially in this position in which it is retained by the guide 2 between the first containing means 4 and the second containing means 5 (shown in a dotted line) placed below the first means. From this position, the capsule is subsequently moved to an extraction position, lower than the intermediate position, in which the capsule flange is then sealingly tightened between the means 4 and 5.

Different shapes of the guiding means 2 are possible; guiding means 2 adapted to allow the insertion of a capsule 3 into the assembly 1 and to retain the capsule 3 itself in an intermediate position between the first and the second containing means 4 and 5, fall within the scope and the object of the present invention. Also guiding means 2, equivalent to those herein described, are adapted to be used, that is movable or rotatable around a pin; for example means elastically deformable under the action of the containing means 4, 5.

In particular, the containing means 4, 5 can be easily adapted to different typologies of capsules, known in the art, without modifying the object of the present invention. Some examples will be suggested from which it will be evident as pre-pierced or punchable capsules, capsules in which the infusion liquid is fed from the flange to the base, i.e. from the capsule portion opposite to the flange, capsules in which the infusion liquid is fed in an opposite direction, that is from the base to the flange, etc., can be used.

In general, the present invention is not limited only to the illustrative embodiments shown in figures, but it is substantially applicable to any type of extracting assembly of a capsule provided with a flange.

The definition "mutually movable containing means" is meant as comprising different interacting configurations between the first containing means 4 and the second containing means 5, whereby both containing means 4, 5 can be movable or else a first containing means 4 is movable and a second containing means 5 is fixed, integral with respect to the frame 13 of the assembly, etc. These and other variations are based on the capsule used in the assembly 1.

Figure 5:
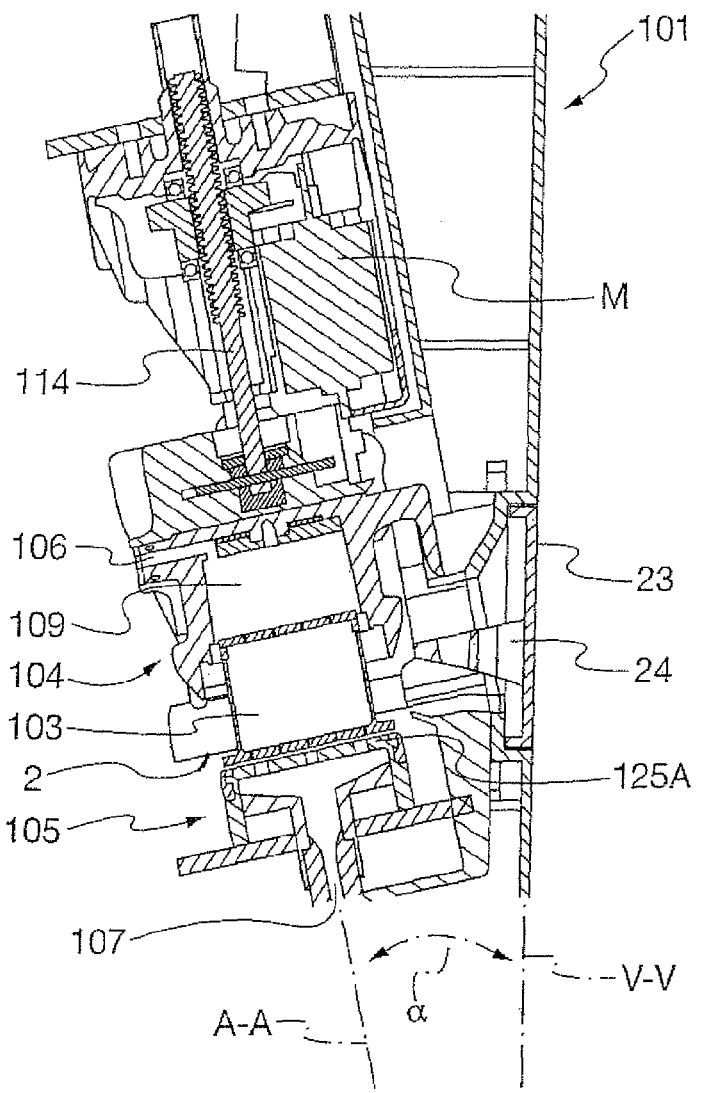
FIGS. 5-7 show a first embodiment of an assembly according to the present invention.
Figure 6:
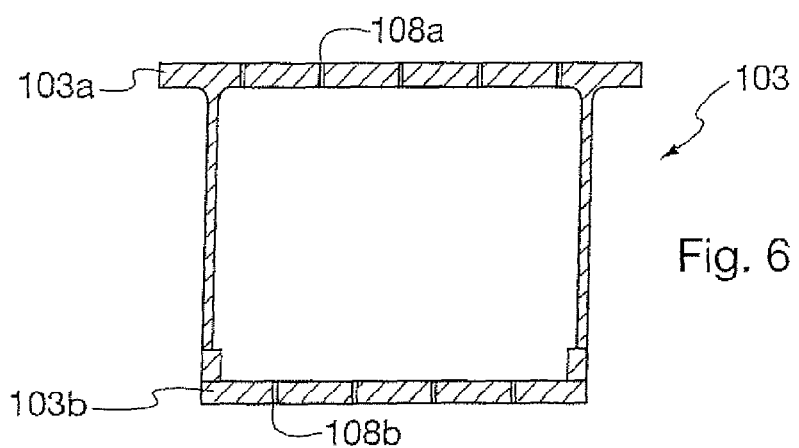
Figure 7:
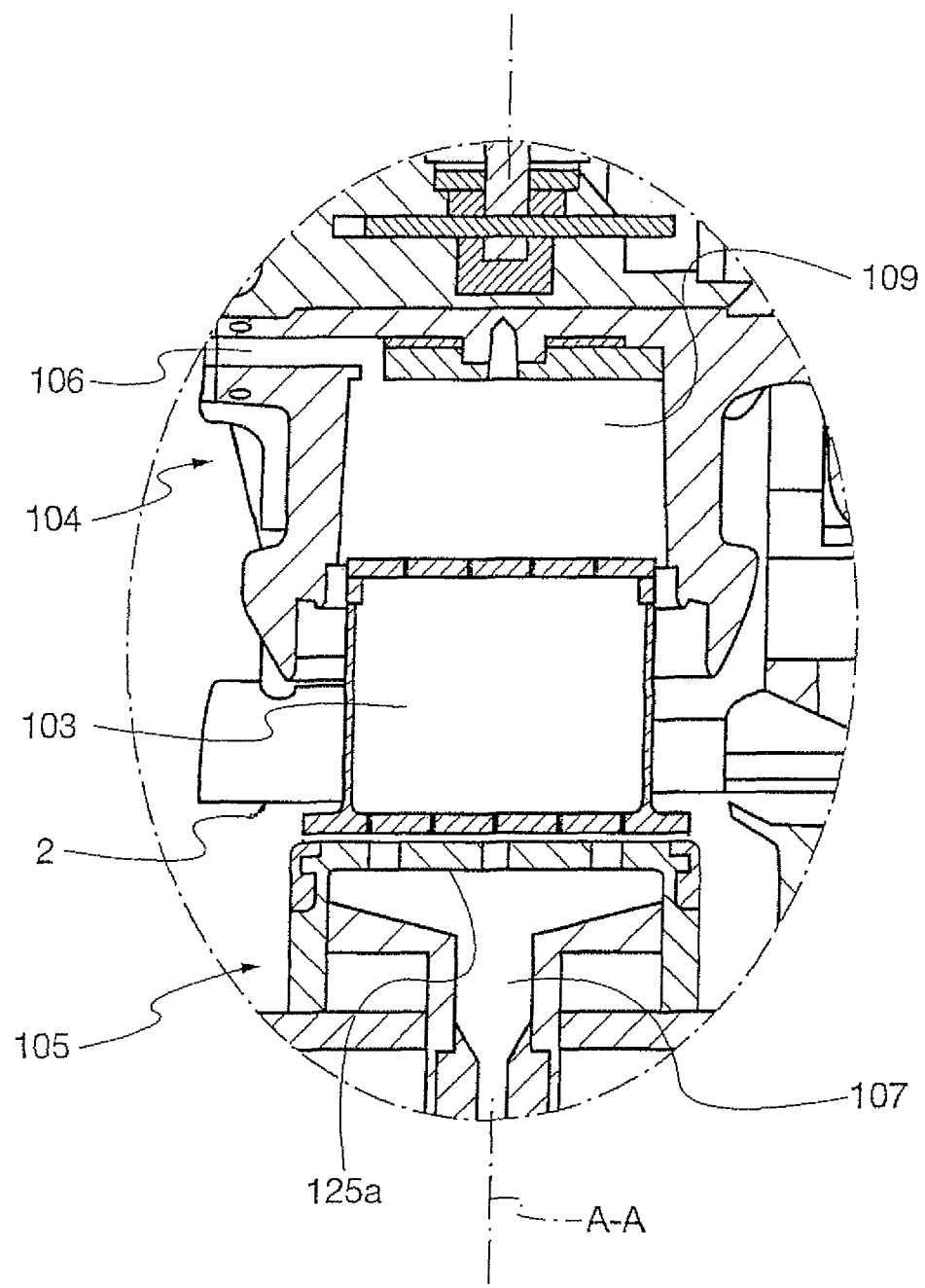

In a first possible embodiment, shown in FIGS. 5-7, a capsule 103 is inserted into an assembly 101, visible in FIG. 6, which is provided, in a way known in the art, with holes 108a, 108b for the input of infusion water and for the beverage output from the capsule 103. In particular, both the base 103b and the wall delimited by the flange 103a of the capsule 103, have holes 108a, 108b adapted for allowing the passage of the infusion fluid from the base 103b towards the flange 103a of the capsule 103. In the shown embodiment, the first containing means 104 are movable, whereas the second containing means 105 are fixed.

In particular in the shown embodiment, the first containing means 104 are movable along a endless screw 114, for example by means of a motor or any other movement means M, known per se in the art. Alternatively, the means 104 can be movable through other means, for example thanks to a lever and a crank mechanism driven by it, as in EP 1757212. The first containing means 104 have a seat 109 for housing at least part of the capsule 103. In particular, the seat 109 is shaped so as to enclose the body of the capsule 103, that is the base of the capsule (the surface opposite to the flange 103a), and the side surface. A duct 106 for feeding the infusion water is fluidically connected to the seat 109 for housing the capsule 103.

On the other hand, the second containing means 105 are fixed, and have a pierced plate 125A supporting the capsule 103, adapted to sustain the capsule and to allow the passage of the infusion liquid. A duct 7 is connected to the beverage dispensing system of the machine.

Preferably, means for piercing the capsule are present on the assembly 1, possibly only for the water input or the beverage output; in an alternative embodiment, the capsule 103 is sized so that to not interfere therewith.

Figure 8:
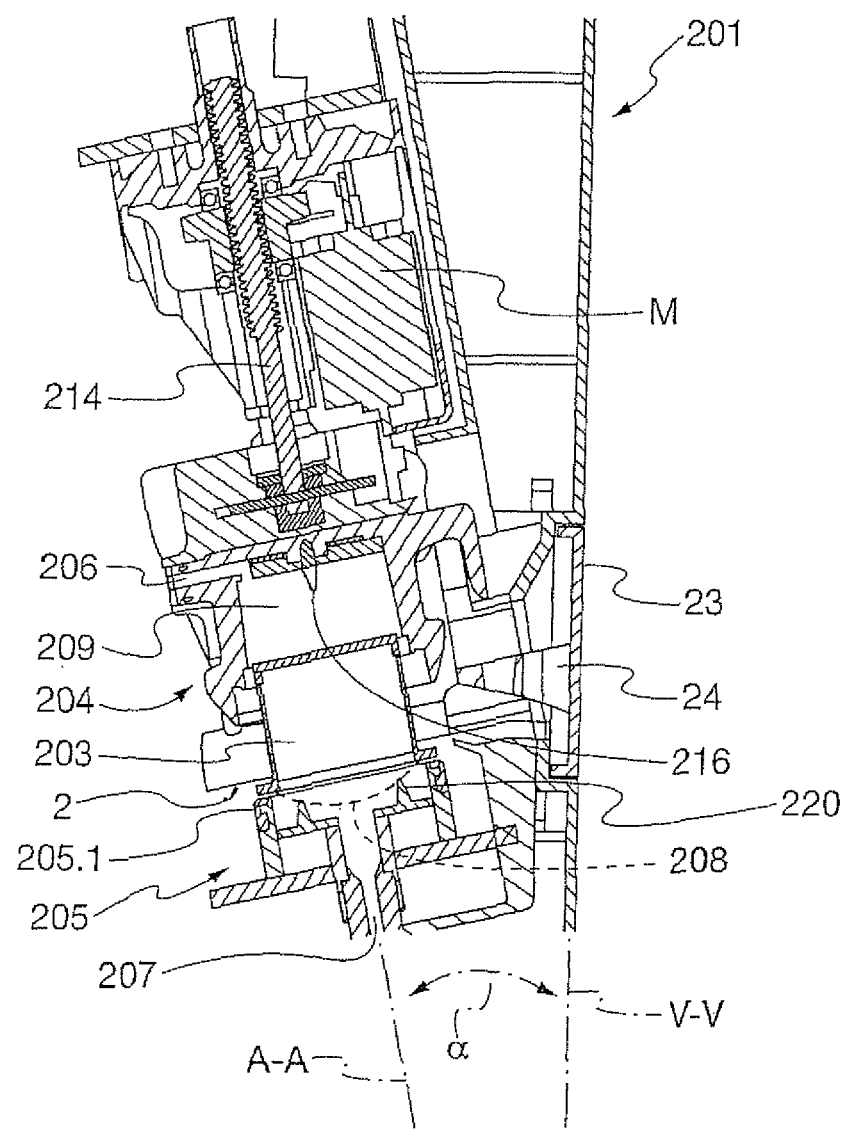
FIGS. 8-10 show a second embodiment of an assembly according to the present invention.
Figure 9:
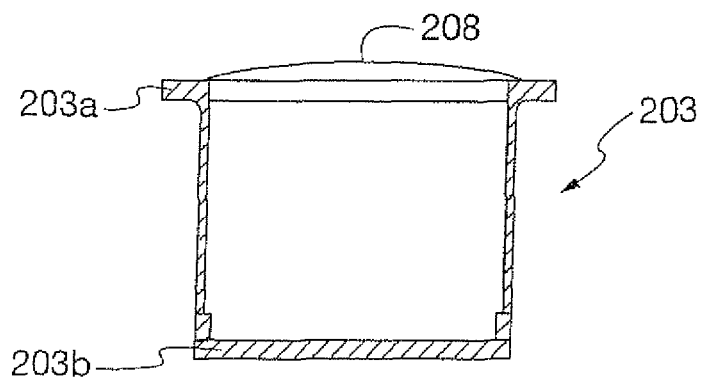
Figure 10:
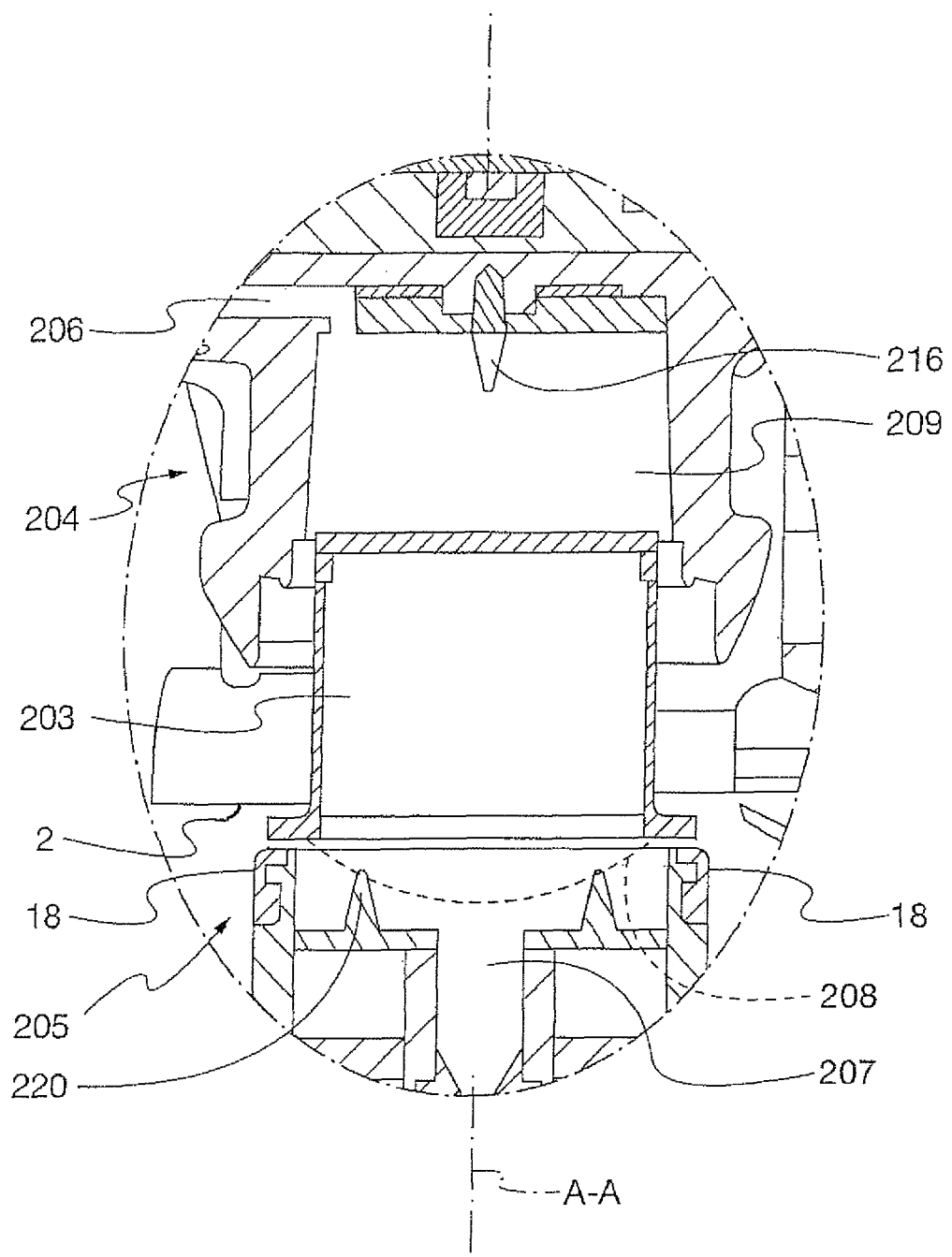
Figure 11:
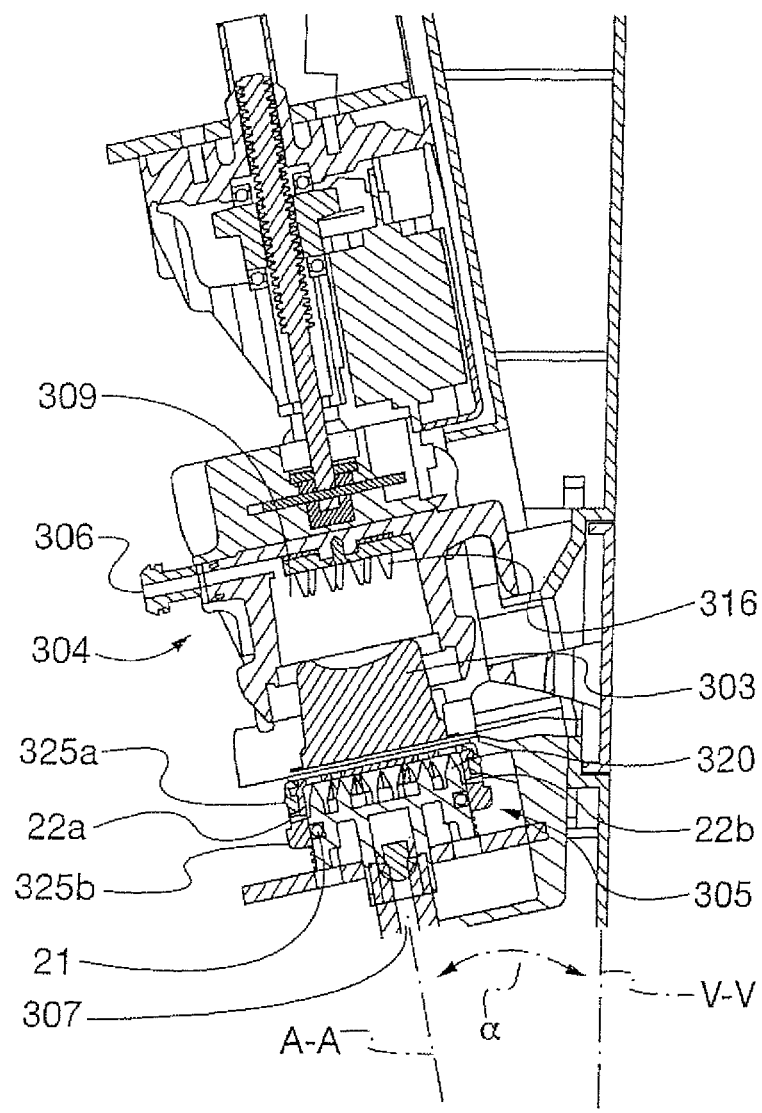
FIGS. 11-14 show a third embodiment of an assembly according to the present invention.
Figure 12:
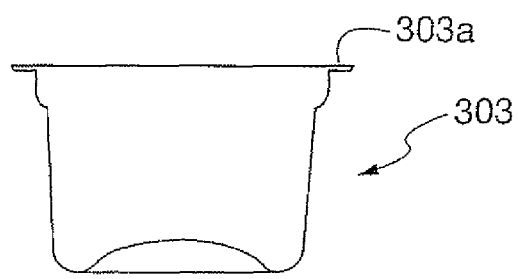

In the embodiment shown in FIGS. 8-10, a further embodiment of an assembly 201 in shown, in which the capsule 203, visible in FIG. 9, is of the closed type and has, in a way known in the art, an inlet side 203b that can be pierced by appropriate means 216 present on the first means 204. The outlet side of the capsule 203 is provided, in a way known in the art, with a membrane 208 extroflexed under pressure for its tear on means 220 placed on the second containing means 205. The infusion liquid is fed through an inlet side, or base, 203b. As afore discussed, in an alternative embodiment the side for the inlet of water into the capsule can be provided with an opening.

The first containing means 204 are substantially identical to the first containing means 104, except for the presence of the piercing means 216; also in this embodiment the infusion water is fed from the upper side of the containing means 204, that is from the duct 206, towards the second containing means 205, wherein a duct 207 is provided and connected to the system for the beverage dispensing.

The second containing means 205 are fixed, and have a rest wall or edge 210 for the flange 203a of the capsule 203. When the pressurized infusion liquid is introduced into the capsule 203, the membrane 208 warps and tears on the piercing means 220 in a known way. As afore mentioned, the second containing means 205 are provided with the duct 207 for dispensing the beverage.

In the embodiment of FIGS. 11-14, the feeding of the infusion liquid takes place in a way opposite to what shown in the preceding two embodiments, that is from the flange 303a towards the base 303b.

In particular, the water is fed towards the capsule 303, housed in the seat 309 of the first containing means 304, through the duct 307 of the second containing means 305. The beverage is then dispensed from the duct 306, placed in the first containing means 304.

The first containing means 304 are very similar to the afore described containing means 104 and 204.

In particular, the differences of the first containing means 304 from what described above, are substantially the configuration of the piercing elements 316, which are realized based on the shape of the respective capsule 303, and the duct 306 that, in this embodiment, is used for the beverage dispensing, whereas in the previously described embodiments the ducts 106, 206 act as ducts for feeding the infusion water.

Figure 4A:
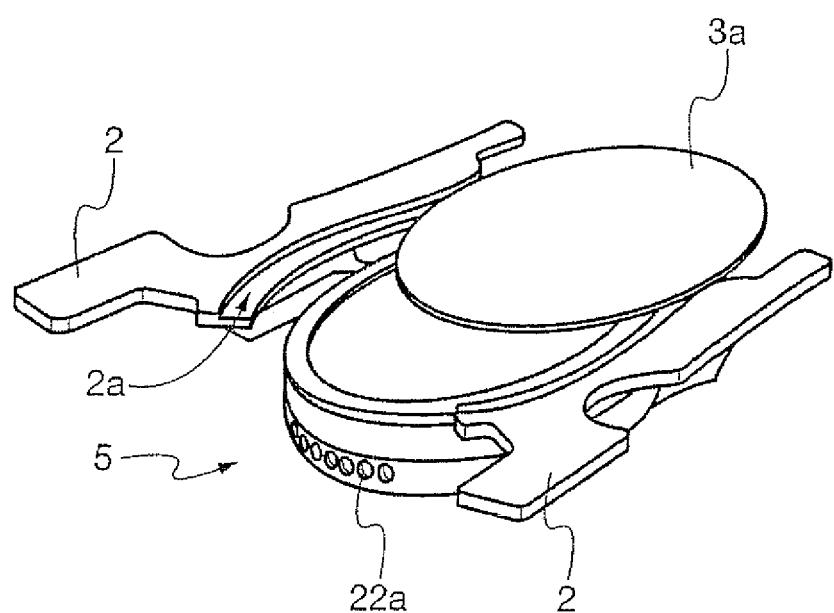
FIG. 4a is a perspective and simplified front view of guiding means and containing means of an assembly according to the present invention.

The general structure of the second containing means 305 is known in the art, for example from Patents PCT/IB2009/055976 and PCT/EP05153294, and it is not object of the present invention. In brief, the second containing means 305 are axially movable with respect to piercing means 320 that, through corresponding holes placed on a plate 325A of the containing means 305, are able to open the capsule 303. The plate 325A is place over a hollow cylinder 325B surrounding the piercing means 320. Vents 22a (FIG. 4A) for discharging water are preferably arranged on the side surface of the hollow cylinder 325B.

Figure 4B:
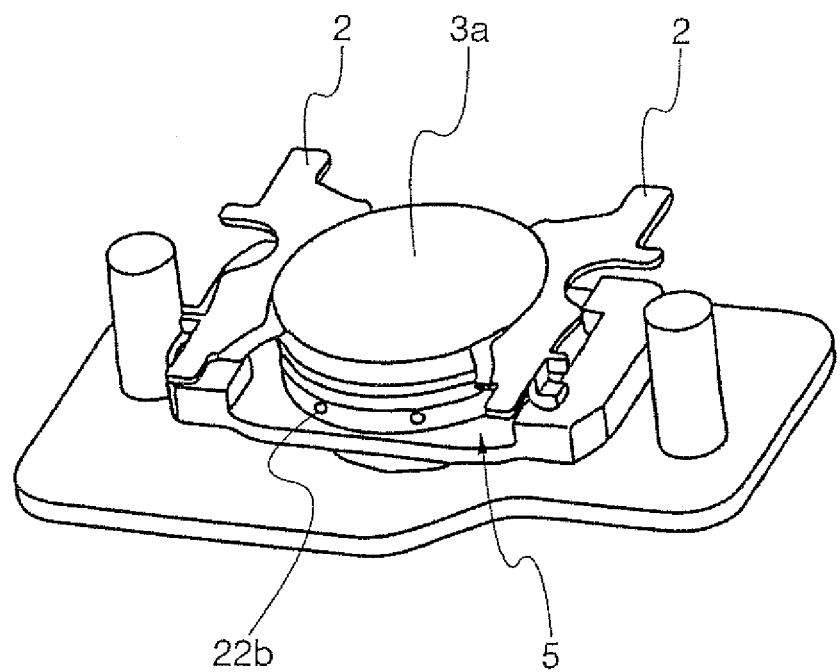
FIG. 4b is a perspective rear view of guiding means and containing means of an assembly according to the present invention.

According to the present invention, inlets 22B (FIG. 4b) are arranged in an upper position, and preferably in a position opposite with respect to the vents 22A. As will be detailed hereinafter, the openings 22B allow the air input inside the second containing means 5, so that to aid, in combination with the tilt of the same containing means, the discharge of excess liquid through the openings 22A.

A gasket 321, placed under the piercing means 320 and integrally therewith, is adapted to cooperate with the openings 22A, 22B.

As can be deduced from the preceding description, the first containing means 4, 104, 204 and 304 are substantially unchanged in their structure among the possible embodiments of the present invention. In FIG. 15 first generic containing means 4 are shown, compatible with the embodiments of the present invention, among which those afore described, and guiding means 2 while they are retaining a capsule 3 in the afore mentioned intermediate position between the first containing means 4 and the second containing means 5.

In particular, the possible variations among the various containing means are graphically highlighted.

A duct 6 for feeding/discharging the water/beverage is shown in dotted line. Position and shape of the outlet of the duct 6 into the seat 9 can vary as a function of the infusion method of the beverage. In general a duct 6 is placed, in a known way, in fluidic communication with the inside of the seat 9 to allow the input of water or the output of the beverage, according to the direction of the water itself.

Also piercing means 16 are shown in dotted line because, as afore reported, they could not be present.

Lastly, the upper part of generic second containing means 5 is shown in simplified form and dotted line, whose shape, on the contrary, changes according to the typology of capsule used in the assembly 1.

Figure 15:
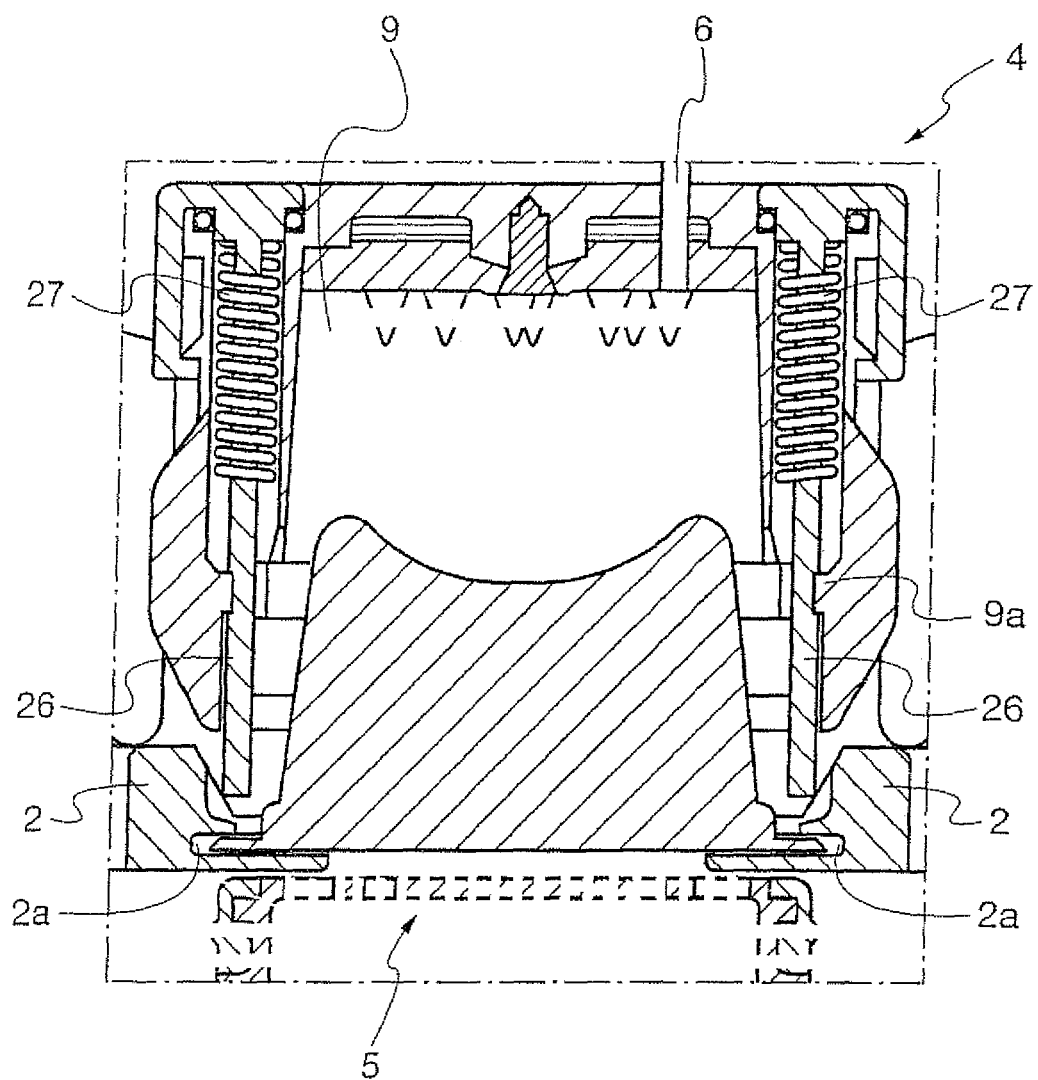
FIG. 15 is a front view of the containing means according to the present invention.

The other features, shown in FIG. 15 by continuous lines, are common for all embodiments.

In particular it is possible to notice, in the first containing means 4, the presence of extracting means 26 for removing the capsule 3 from the seat 9 at the end of the beverage dispensing. The extracting means 26 are movable with the first means 4 with respect to the second means 5 and they are further movable with respect to the first containing means 4. In the shown embodiment the extracting means 26 are shaped as bars or plungers 26, which are axially movable inside a seat obtained in the side surface of the first containing means 4. Usually elastic means 27 urge the plungers 26 outwards with respect to their own seat, i.e. towards a position protruding with respect to the edge 9a of the seat 9. The operation of the plungers 26 will be cleared in the following, during the treatise of the operation of the assembly 1; it is evident that shape and operation of the extracting means 26 are substantially identical for all embodiments.

In general, the invention covers all possible embodiments of containing means and all possible embodiments of means for feeding the water and dispensing the beverage that are provided with the guides 2 and the plungers 26 according to the present invention.

The embodiments of the present invention providing for the feeding of infusion fluid from the capsule flange, as the embodiment of FIGS. 11-14, can be further provided with means for discharging the exhausted infusion liquid remained at the capsule 3, 303 at the end of the beverage dispensing. The discharging means use the tilt of the containing means so that to allow the removal of the exhausted liquid by gravity, at the end of the infusion.

A possible embodiment of such discharging means 22A, 22B, 12 is shown referring to FIGS. 2, 4 and 11-14.

In particular, the second containing means 305 can be provided with a plurality of vents 22A for the discharge of the exhausted water. Furthermore, as shown in the embodiment of FIGS. 4b and 11-14, additional inlets 22B are preferably present in a position opposite to the vents 22A. The inlets 22B are adapted to draw air into the second containing means 305 so that to aid the ejection of the infusion liquid and to avoid the permanence of a "vacuum effect" between the capsule 303 and the second containing means 305.

Figure 2:
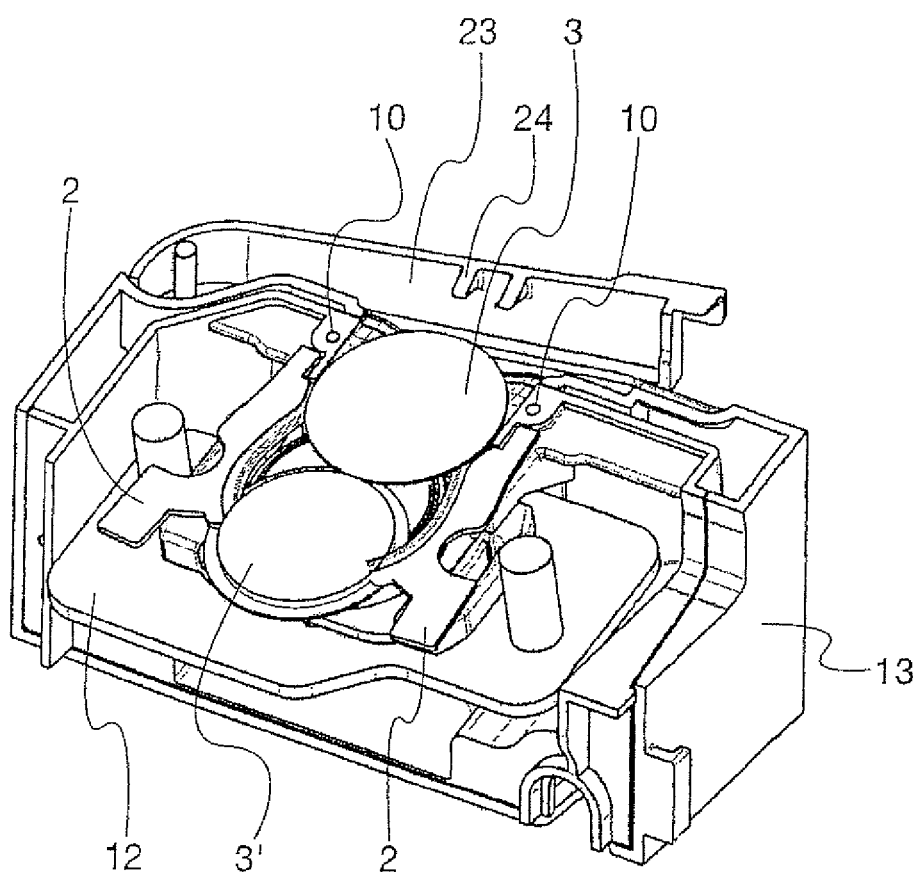
FIG. 2 is a perspective view of the bottom portion of an assembly according to the present invention.
Figure 3:
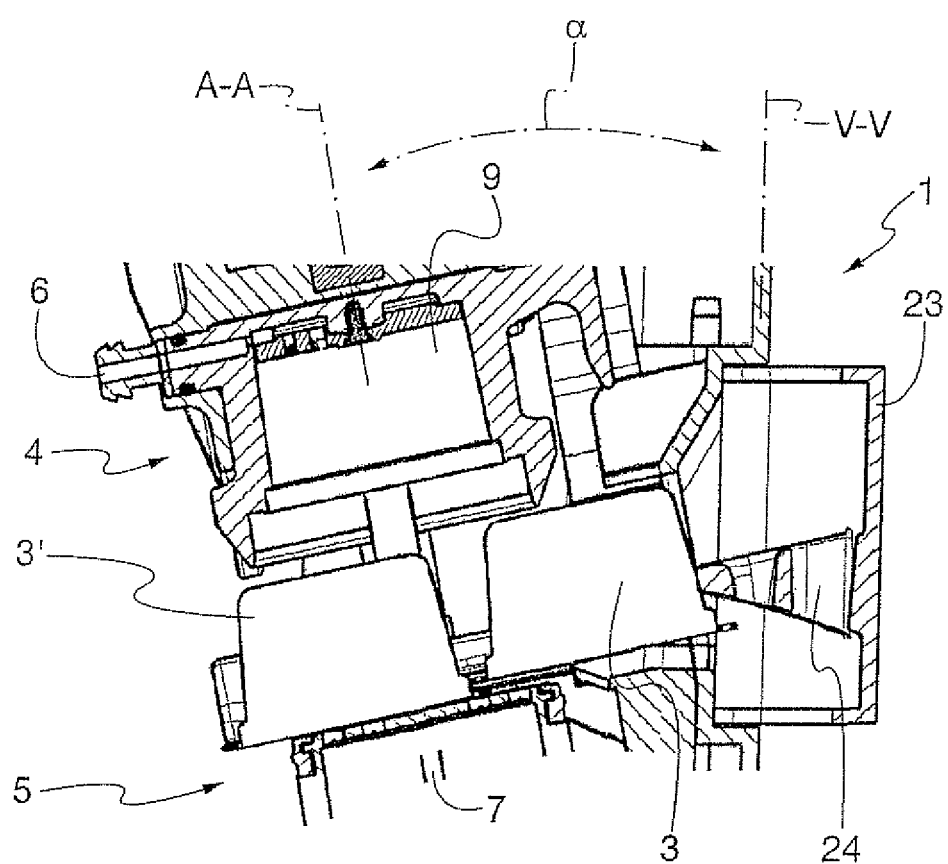
FIG. 3 is a side sectional view of an assembly according to the present invention during the insertion of a new capsule.

As shown in FIG. 2, there is preferably a chute 12 adapted to allow the outflow of beverage and infusion liquid in excess, which have been previously ejected from the hollow cylinder 25B through the vents 22A.

As an alternative to holes 22A other means can be used, for example the employed gasket can have a not-flat shape, with a plurality of reliefs, so that a tightness is present when the flange of the capsule 3 is compressed between the means 4 and 5, whereas in absence of compression, such as for example at the end of the infusion and dispensing step of the beverage, the ridges of reliefs raise the flange with respect to the rest of the gasket and allow the air passage between flange and gasket. Referring to FIGS. 2-4 and 16-21, it is now described the operation of the assembly 1 according to the present invention, particularly referring to the operation of plungers 26. Such an operation of plungers 26 is applied to all above described embodiments.

A capsule 3 is initially inserted into the opening 28 of the frame 13. By closing the door 23, the pushing means 24 push the capsule 3 into the assembly 1, along the guiding means 2. As can be seen in FIGS. 2 and 4, the capsule 3a slides inside the profile 2a (see also the enlarged details of FIGS. 20 and 21) shaped as a "U" or an asymmetrical "U" of the guiding means 2; the guiding means 2 house part of the flange and raise it with respect to the second containing means. At the same time, if an exhausted capsule 3' is present, already used in the previous dispensing, the flange 3a presses against it and causes its ejection from the dispensing area. In fact, the exhausted capsule 3' is not inside the guiding means 2, but it is in a position lower with respect to the latter, rested against the second containing means 5, as better described in the following. During the inserting and sliding step inside the profile 2a, the capsule 3 splays the guiding means 2, for example acting on a portion 2b protruding therefrom. Next, the flange 3a continues its path along the guiding means 2 until it is at a recessed portion 2c, so that to aid the closing of the guiding means 2 around the capsule 3. The capsule 3 is then in the position shown in FIG. 15, that is with the flange 3a retained in the profile 2a of the guiding means 2, in a position superior to the second containing means 5 and spaced out therefrom. At the same time, the capsule 3 is in position lower than the first containing means 4.

Once the capsule 3 has been positioned, as in FIG. 15, the first containing means 4 are lowered towards the means 5, for example by the movement means M, and they start their own descent.

Figure 16:
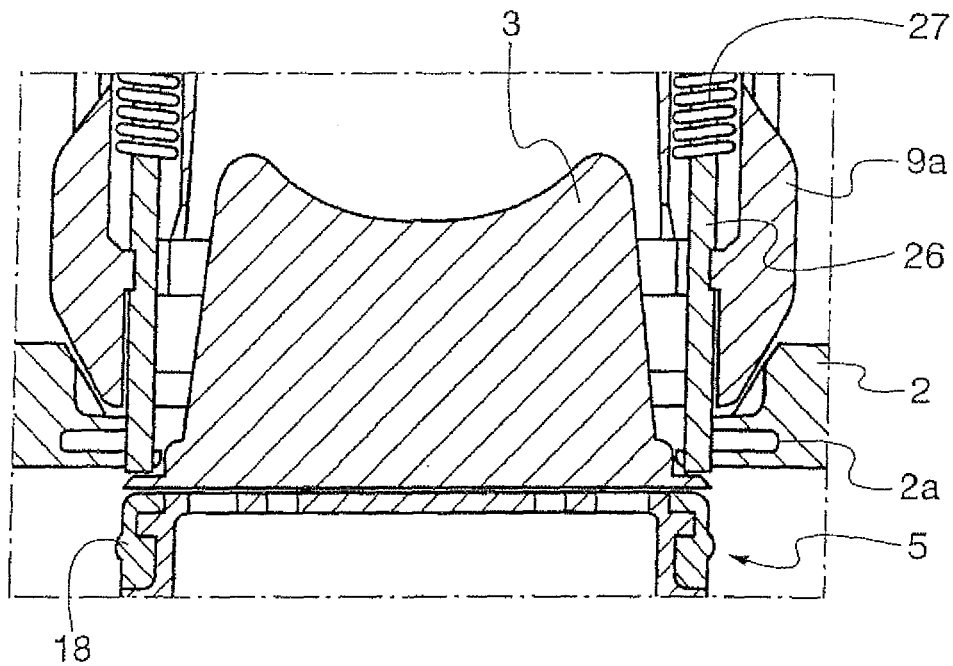
FIGS. 16-21 show front views of operative steps of the containing means of an assembly according to the present invention.

During the descent, the containing means 4 engage and splay the guiding means 2. The capsule 3 is then released from the latter and the profile 2a and it drops by gravity on the second containing means 5. The first contacting means continue their descent, the plungers 26 contact the flange 3a and the housed body of the capsule 3 starts its insertion into the seat 9, as seen in FIG. 16.

Figure 17:
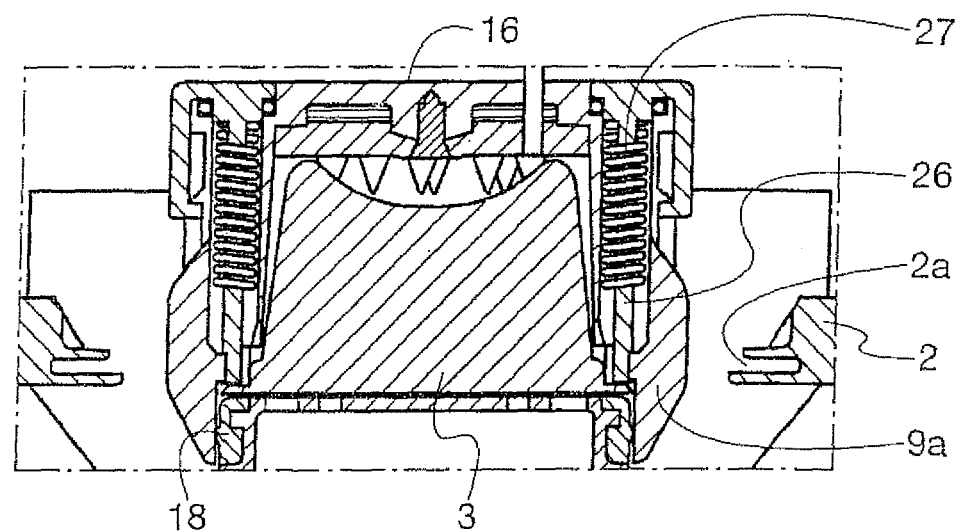

In the following, the first containing means 4 continue their own descent, and the counteraction of the capsule 3 rested on the second containing means 5 causes the withdrawal of the plungers 26 inwards the first containing means 4, thereby countering the action of the elastic means 27. The capsule body is then completely inserted inside the seat 9. The edge 9a of the seat 9 engages the flange of the capsule 3 and compresses the gasket 18 of the second containing means 5, so that to realize a fluid-tight seal of the seat 9 (FIG. 17)

Then the opening of the capsule 3 (if necessary) is carried out in a known way and the infusion and preparing step of the beverage is carried out too.

Particularly referring to details shown in FIGS. 18-21, it is now described an extracting method of the capsule 3 from its own seat 9, the method being object of the present invention and identical for all shown embodiments.

Figure 13:
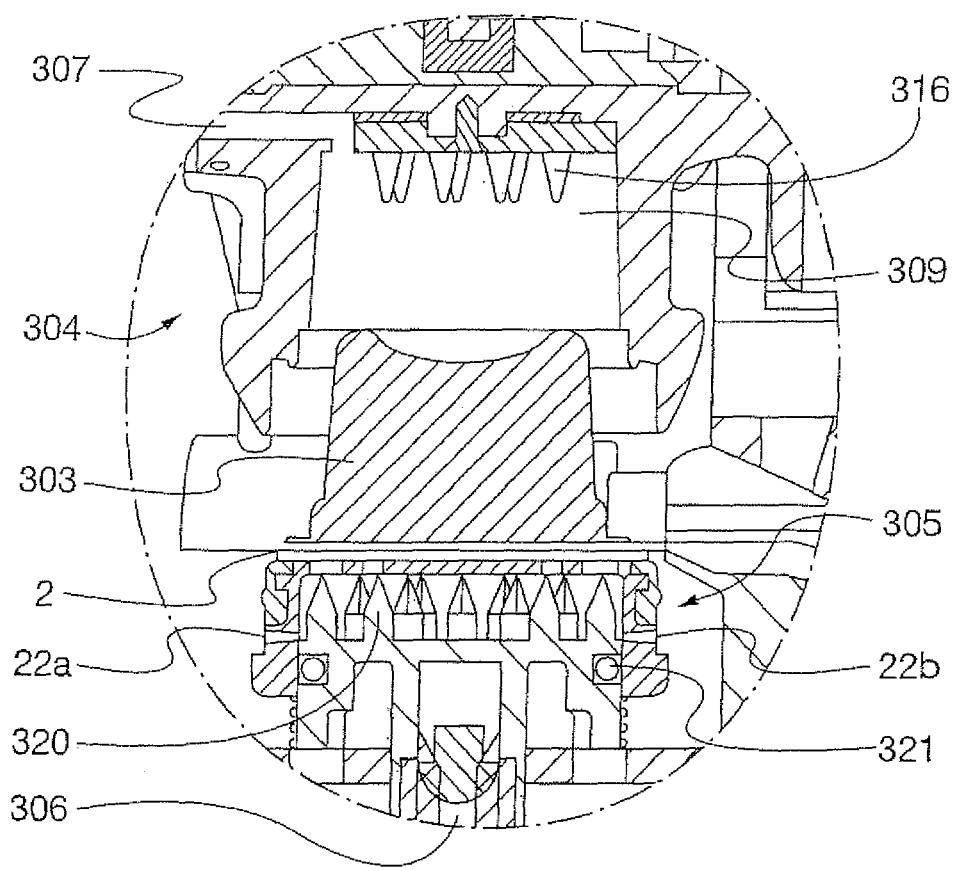
Figure 14:
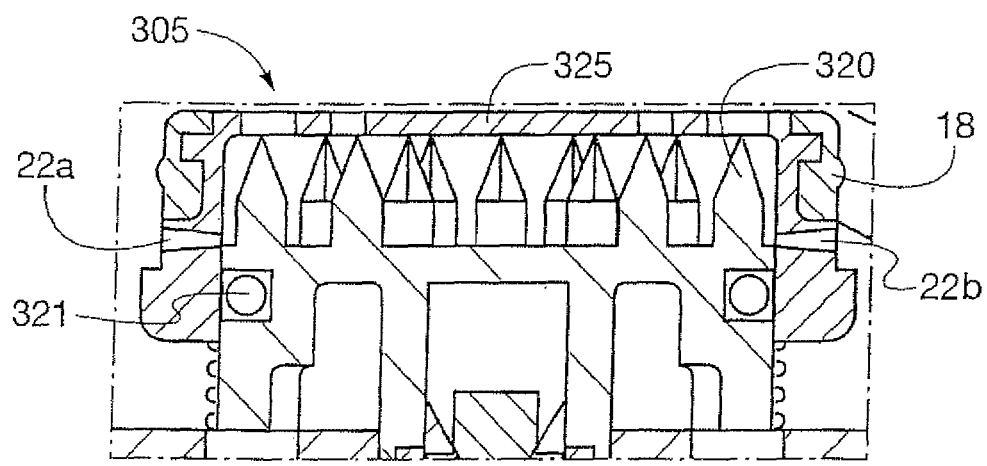
Figure 18:
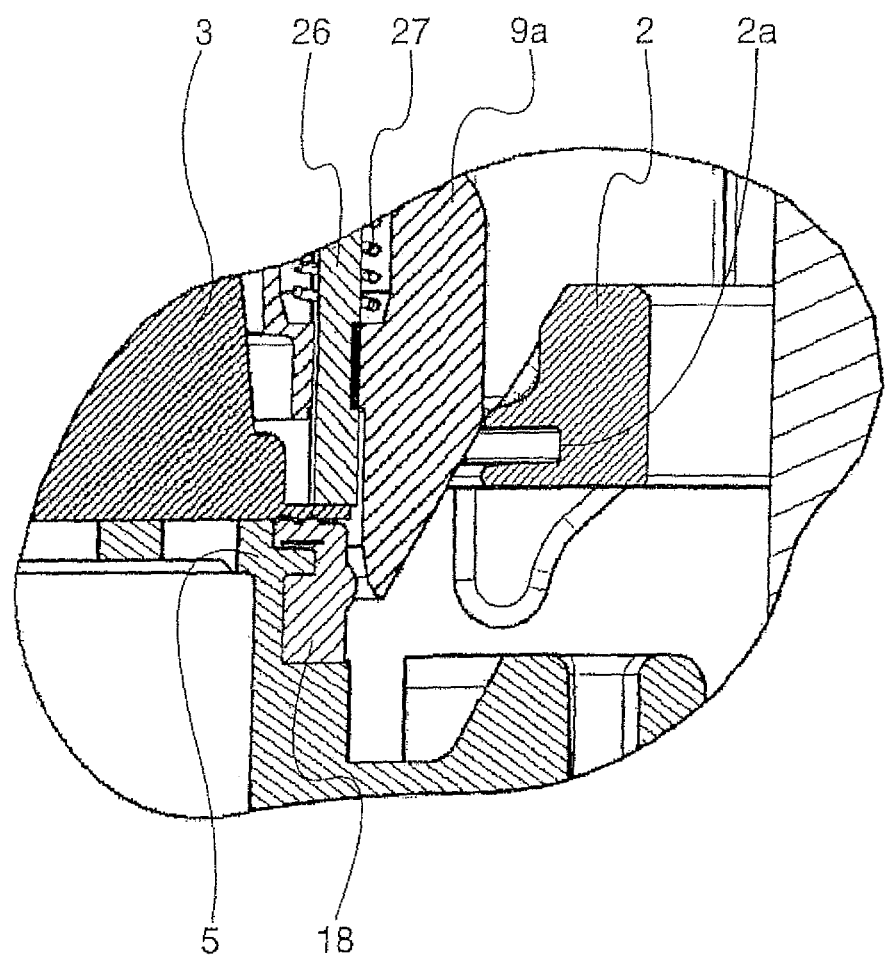

At the end of the dispensing, the first containing means 4 are in the condition shown in FIG. 13. The means 4 go up from here towards their initial position, retracing the above described steps in backward. At the beginning, as shown in FIG. 18, the edge 9a of the inner wall of means 4 disengages from the gasket 18. The plungers 26 are biased by the elastic means 27 outwards and, in this step, have a relative movement with respect to the first containing means 4, remaining in abutment against the flange 3a of the capsule 3. Thanks to the action of the plungers 26, the capsule 3 is kept in position on the means 5 and the capsule starts its extraction from the seat 9 of the first containing means 4. In addition, between the second containing means 5 and the capsule 3, as a consequence of the infusion, a "vacuum effect" can be created, aiding the action of the plungers 26 in extracting the capsule 3 from the seat 9.

Figure 19:
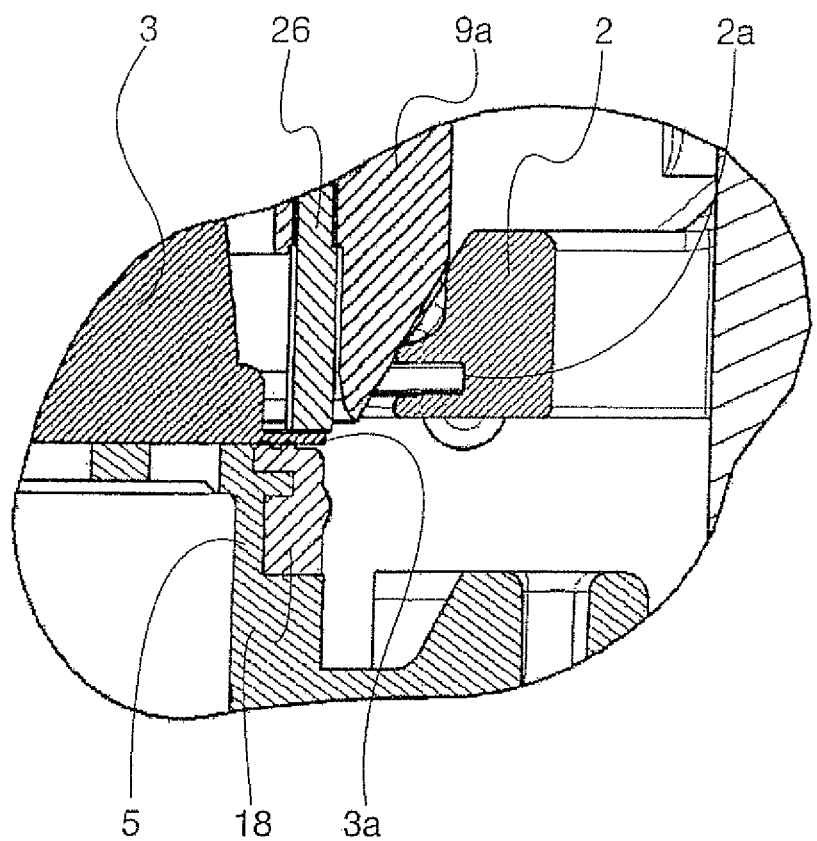
Figure 20:
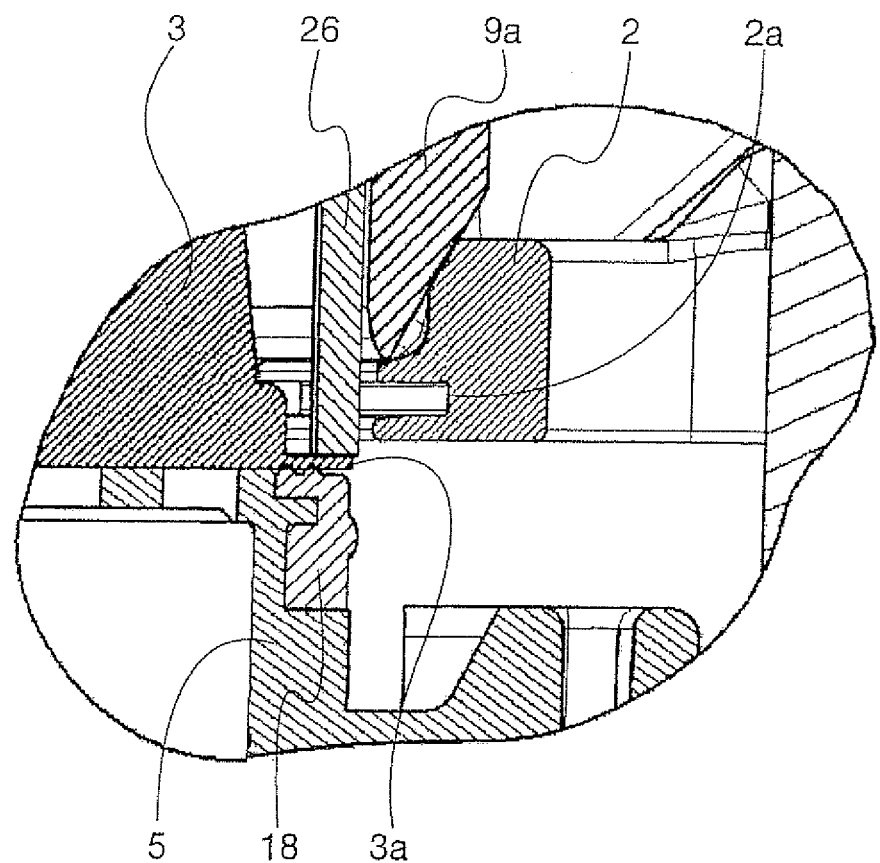

In FIGS. 19 and 20 the following steps are illustrated, in which the first containing means 4 come back upwards. The plungers 26 remain in abutment against the flange 3a up to the ends of stroke of the elastic means 27; in the meanwhile, the guiding means 2 start their run towards their initial position; in this regard it has to be noticed that in the present invention, differently from those according to the known art, the guiding means 2, i.e. the jaws initially retaining the capsule, do not extract the capsule from the housing 9, that is from the means 4. As afore described, the plungers 26 carry out such an operation.

Figure 21:
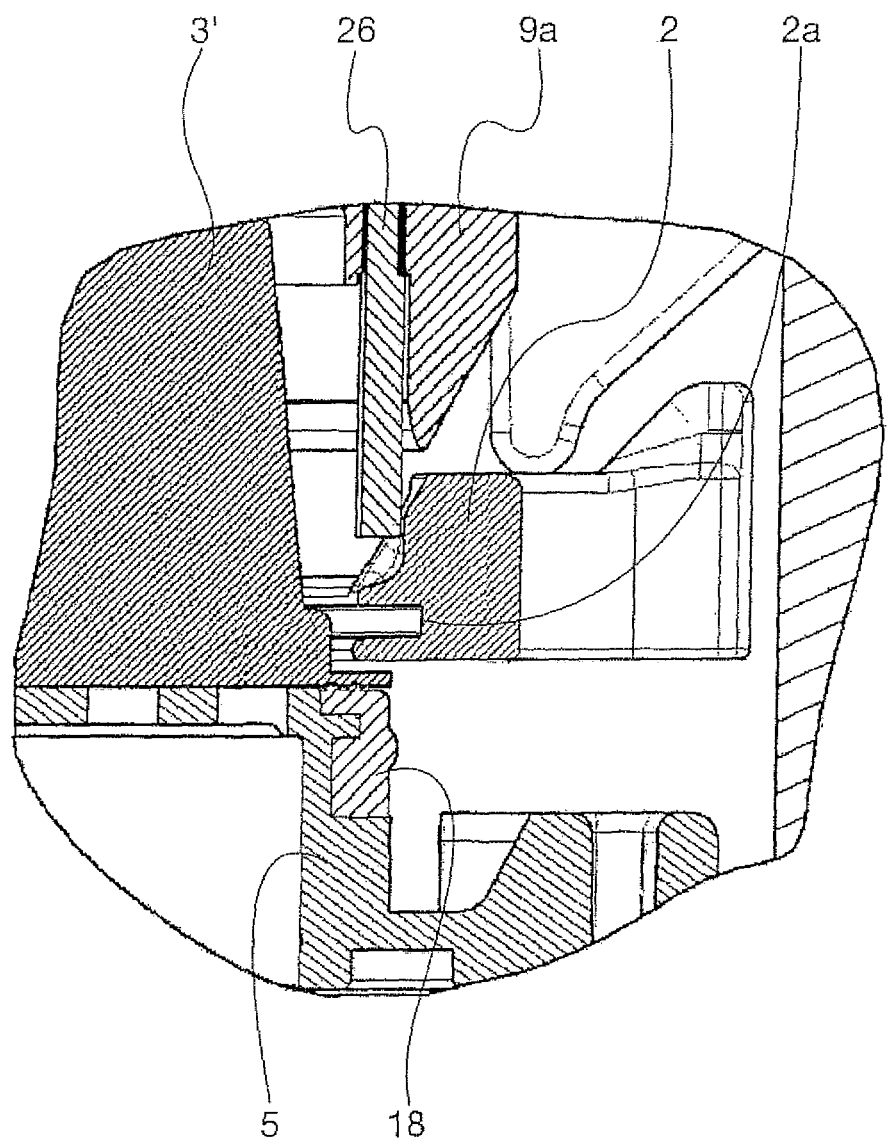

In FIG. 21 the plungers 26 have spent the run of the elastic means 27, whereby the disengagement of the capsule 3, from both the first containing means 4 and the plungers 26, happened. Then the capsule 3 remains rested on the second containing means 5, and in the following the operation of insertion of a new capsule, it will operate as an exhausted capsule 3', described above, i.e. it will be ejected from the assembly 1 according to the afore described modes.

Concerning the embodiment providing the discharging means 22A, 22B, 12, in the following the method for the ejection of the infusion liquid still exceeding at the end of the beverage preparation, is presented.

Referring to the shown embodiment, during the step in which the first containing means 304 come back upwards, the openings 22A and 22B (FIG. 14) are moved back in a position upper than the gasket 321.

Due to the tilt of the axis A-A of the containing means 304, 305, the liquid in excess does not stagnate inside the second containing means 305, but it is ejected by gravity through the vents 22A. It is then possible that during the infusion step, a vacuum effect has been created between the capsule 303 and the second containing means 305, that could impair the efficiency of the vents 22A thereby impeding a correct output of the liquid in excess through the same openings. The presence of the inlets 22B cures such a disadvantageous possibility. More in detail, the fluidic connection of the inlets 22B with the inner portion of the second connecting means 305, allows the air coming into them, so that to end the mentioned vacuum effect. Thanks to this, it is possible to ensure an effective ejection of the liquid in excess through the vents 22A.

Preferably, once the liquid has been ejected from the vents 22A, it continues its own run on the chute 12 so that to be removed from the assembly 301.

It has to be noticed that, in this embodiment, it is necessary to ensure a movement, although limited, between the second containing means 305 and the gasket 321. As a matter of fact, during the infusion step of the beverage, the openings 22A and 22B must be placed under the gasket 321, so that to fluidically preclude the openings 22A and 22B from the water path during the infusion, and then to avoid the liquid output from the same openings. At the end of the infusion, a relative movement between the containing means 5 and the gasket 321 allows the air passing through the inlets 22B and the output of the fluid through the vents 22A, according to the afore described mode.

In the shown embodiment the piercing means 320 and the gasket 321 are fixed with respect to the frame 13, whereas the second containing means 305 are movable with respect to the same. It is clear that the contrary solution can be provided, in which the second containing means 305 are fixed, whereas the piercing means 320 and the gasket 321 are movable.

It has to be underlined that the shown embodiments are only some of the possible embodiments of the present invention. For example, it is possible to use pierced capsules having flow direction of the infusion liquid from the flange to the base, capsules with auto-piercing means having flow direction of the infusion liquid from the base to the flange, and other combinations of the shown embodiments and, in general, of the various typologies of capsules on the market having a flange.

The field technician well comprises that the herein described invention can be adapted to other capsule solutions and feeding/dispensing systems of the infusion liquid/beverage different from what described above, and that these systems still fall in the protection of the present invention, defined by the appended claims and not limited to the embodiments shown in the above description and illustrated in the appended figures.

The invention claimed is:

1. A machine for preparing beverages from capsules, said machine having a vertical axis, said machine comprising a dispensing assembly comprising:
   containing means for containing a capsule, comprising a first element and a second element movable one respect to the other to define, in a closed position, a chamber for extracting the capsule, according to an axis of said containing means;
   guiding means for inserting the capsule inside said assembly, and for retaining it in an intermediate position, different from the extraction position of the beverage; and
   ducts for feeding an infusion fluid into said capsule and dispensing a beverage from said capsule,
   wherein said axis of the containing means of the capsule is tilted with respect to the vertical axis of the machine of an angle lower than 45 degrees, and
   wherein said capsule is retained by the guiding means in said intermediate position above the second element of the containing means and spaced out therefrom.

2. The machine according to claim 1, wherein said angle is comprised in the range between 3 and 18 degrees.

3. The machine according to claim 1, wherein said second element of the containing means comprises a pierced rest plate for the capsule, said rest plate being part of a hollow cylinder provided with vents for the infusion fluid and inlets for the air, placed in a position higher than said vents.

4. The machine according to claim 3, wherein said inlets are placed in a position opposite with respect to said vents.

5. The machine according to claim 1, wherein said guiding means retain the capsule in a position coaxial to the axis of the containing means.

6. The machine according to claim 1, further comprising means for extracting the capsule, adapted to disengage said capsule from said containing means after the beverage has been dispensed.

7. The machine according to claim 1, wherein said extracting means are housed in the movable element of the containing means and they are urged elastically in a position projecting from said first element.

8. The machine according to claim 7, wherein said first element is arranged to splay the guiding and containing means of the capsule and to drop the capsule into the extraction position by gravity.

9. An extracting assembly to be used in a machine for dispensing beverages, as defined according to claim 1.

10. The machine according to claim 1, wherein said angle is in the range between 8 and 15 degrees.

* * * * *